United States Patent Office 3,814,765
Patented June 4, 1974

3,814,765
8,9-DIDEHYDRO-10-ALKOXY-ERGOLENES AND
PROCESS OF PREPARATION THEREOF
Luigi Bernardi, Bianca Patelli, and Aldemio Temperilli,
Milan, Italy, assignors to Societá Farmaceutici Italia,
Milan, Italy
No Drawing. Filed Oct. 4, 1971, Ser. No. 186,385
Claims priority, application Italy, Nov. 12, 1970,
54,660/70
Int. Cl. C07d 43/20
U.S. Cl. 260—268 PE
13 Claims

ABSTRACT OF THE DISCLOSURE

A compound of the formula:

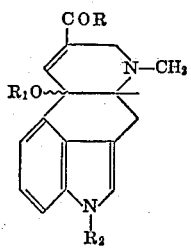

wherein R is selected from the group consisting of alkoxy, amino, substituted amino, cycloalkylamino and a complex amine of the ergot series of the formula:

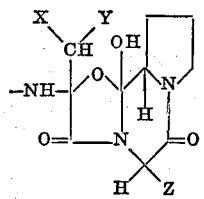

wherein X and Y are selected from the group consisting of H and $CH_3$ and Z is selected from the group consisting of benzyl, isopropyl and isobutyl radical; $R_1$ represents a linear aliphatic alkyl of from 1 to 4 carbon atoms, and $R_2$ is selected from the group consisting of hydrogen and of an alkyl having from 1 to 4 carbon atoms.

Also described is a process for making these compounds which are readily convertible into the corresponding 8 substituted-10ξ-alkoxy-ergoline derivatives.

The present invention relates to new ergolene derivatives and to a process for their preparation.

More particularly, the present invention has as its object a new class of 8,9-didehydro-10-alkoxy-ergolenes of the formula:

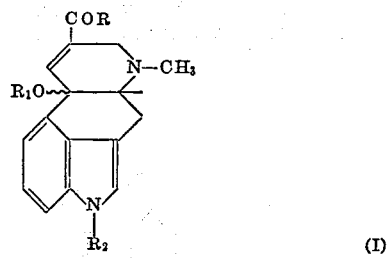

wherein R is selected from the group consisting of alkoxy, amino, substituted amino, cycloalkylamino and the radical of a more complex amine of the ergot series of the formula:

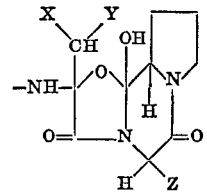

wherein X and Y are selected from the group consisting of H and $CH_3$ and Z is selected from the group consisting of benzyl, isopropyl, and isobutyl radical; $R_1$ represents a linear aliphatic alkyl having from 1 to 4 carbon atoms; and $R_2$ is selected from the group consisting of hydrogen and an alkyl having from 1 to 4 carbon atoms.

According to the process of the invention, 8,9-didehydro-10-alkoxy ergolene derivatives may be prepared starting from the corresponding 9,10-didehydro-ergolene. More particularly, the products having the above-mentioned formula (I) are prepared by the process represented by the scheme:

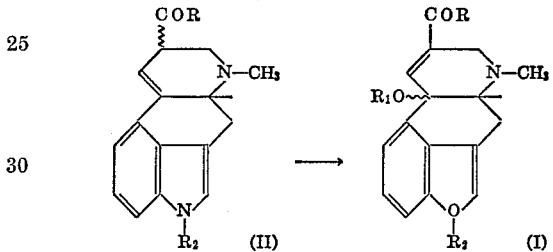

wherein R, $R_1$ and $R_2$ are as defined above. The starting products of formula (II) are known in the literature and may have the $\alpha$ and $\beta$ configuration in position 8. Some of them are described in A. Hoffmann, Die Mutterkorn Alkaloide (1964).

The alkyl group in position 1 of the ergolinic ring may be introduced before or after the process of the invention. Such alkylation may be carried out with an alkyl halide such as an alkyl iodide in liquid ammonia and in the presence of potassium amide. The process of the invention is carried out by reacting the above-mentioned 9,10-didehydro-ergolene of formula (II), or one of its salts, with a mercuric salt, such as mercuric acetate, in a solution of an aliphatic alcohol of the formula $R_1OH$. The reaction is carried out at a temperature of from 0° to 50° C., for a period of 2–24 hours.

When the reaction is over, the excess of the salt is preferably removed by reduction with sodium borohydride and the obtained product is isolated and purified according to known techniques.

The products of the present invention constitute an important intermediate to prepare known compounds that are pharmacologically active. In fact, by reduction with hydrogen, in the presence of a noble metal, the corresponding 8ξ-substituted-10ξ-alkoxy-ergoline derivatives may be obtained, which are starting products for preparing therapeutically active compounds. See U.S. Pat. 3,228,443 and application Ser. No. 740,108, filed June 26, 1968, now U.S. Pat. 3,585,201.

The following Examples are given to illustrate the invention without limiting it.

EXAMPLE 1

6-Methyl-8-carbomethoxy-10α-methoxy-8,9-didehydro-ergolene

A solution of 11.25 g. of mercuric acetate in 250 ml. of anhydrous methanol was added to a solution of 10 g. of methyl lysergate in 150 ml. of anhydrous methanol.

The reaction mixture was allowed to stand, under shaking, for 2 hours. The reaction mixture was then cooled with an ice bath, the pH adjusted to 9.3 with sodium hydroxide and treated with a solution of 1.33 g. of sodium borohydride in 10 ml. of water. The whole was poured into crushed ice and extracted with chloroform. The chloroform extract was washed with a saturated solution of sodium chloride and evaporated to dryness under vacuum.

The residue was chromatographed over neutral alumina, eluting with chloroform. By crystallization from ethyl ether 7.4 g. of 6-methyl-8-carbomethoxy-10α-methoxy-8,9-didehydroergolene melting at 189-190° C., were obtained:

$$\lambda_{max.}^{(CH_3OH)} = 297 \text{ nm.};$$

$[\alpha]_D^{20} = -270°$ (c.=0.3 in chloroform).

EXAMPLE 2

6-Methyl-8-carbomethoxy-10α-ethoxy-8,9-didehydroergolene

Operating as in Example 1, but employing ethyl alcohol, 6 - methyl - 8 - carbomethoxy-10α-ethoxy-8,9-didehydroergolene melting at 220-222° C. was obtained: $[\alpha]_D^{20} = -262°$ (c.=0.3 in chloroform);

$$\lambda_{max.}^{(CH_3OH)} = 297 \text{ nm.}$$

EXAMPLE 3

6-Methyl-8-carboxamido-10α-methoxy-8,9-didehydro-ergolene

To a solution of isolysergamide in 300 ml. of anhydrous methanol and 5 ml. of glacial acetic acid, a solution of 10.8 g. of mercuric acetate in 120 ml. of anhydrous methanol was added slowly dropwise. The reaction mixture was allowed to stand under shaking for 24 hours.

Operating as in Example 1, the mixture was then reduced with a solution of 1.27 g. of sodium borohydride in 10 ml. of water. The reaction mixture was poured into crushed ice and extracted with chloroform. The chloroform extract was washed with a saturated solution of sodium chloride and evaporated to dryness. The residue was chromatographed over silica gel by eluting with a mixture of chloroform-methanol (4:1). By crystallization from acetone, 2.1 g. of 6-methyl-8-carboxamide-10α-methoxy - 8,9 - didehydroergolene melting at 143-145° C. were obtained: $[\alpha]_D^{20} = -230°$ (c.=1 in chloroform);

$$\lambda_{max.}^{(CH_3OH)} = 297 \text{ nm.}$$

EXAMPLE 4

1,6-Dimethyl-8-carboxamido-10α-methoxy-8,9-didehydro-ergolene

Operating as in Example 3 and employing as the starting material, 1-methyl-isolysergamide, 1,6-dimethyl - 8-carboxamido - 10α - methoxy - 8,9 - didehydro-ergolene melting at 145-147° C. was obtained after crystallization from methanol; $[\alpha]_D^{20} = -218°$ (c.=0.3 in chloroform);

$$\lambda_{max.}^{(CH_3HO)} = 303 \text{ nm.}$$

EXAMPLE 5

(+)-6-Methyl-8-(2'-butanolcarboxamido)-10α-methoxy-8,9-didehydro-ergolene

Operating as in Example 1, but employing as the starting material (+2)-butanolamide of the lysergic acid, the above-mentioned product, melting at 138-140° C. was obtained; $[\alpha]_D^{20} = -192°$ (c.=1 in methanol).

EXAMPLE 6

8,9-Didehydro-10α-methoxy-9,10-dihydro-ergocryptine 5 g. of ergocryptine were dissolved in 110 cc. of methanol, 2 cc. of acetic acid were added and the whole was reacted with 5 g. of mercuric acetate dissolved into 70 cc. of methanol, slowly added, under stirring and at room temperature. After making the reaction mixture alkaline with sodium hydroxide, 1.5 g. of sodium borohydride were added. After 30 minutes the whole was diluted with water and extracted with chloroform. The extract was washed with water, dried over sodium sulphate and the solvent was evaporated off under vacuum. The residue was chromatographed over silica gel. From the fractions eluted with benzol:ethyl acetate at the ratios of 80:20 and 40:60, 3.2 g. of product which was crystallized from acetone, melting at 183-185° C. (decomposition) was collected; $[\alpha]_D^{20} = -123°$ (c.=1 in chloroform).

EXAMPLE 7

8,9-Didehydro-10α-methoxy-9,10-dihydroergotamine

Operating as in Example 6, starting from the ergotamine, 8,9 - didehydro - 10α-methoxy-9,10-dihydroergotamine melting at 198-200° C. (decomposition) was obtained; $[\alpha]_D^{20} = -134°$ (c.=1 in chloroform).

EXAMPLE 8

8,9-Didehydro-10α-ethoxy-9,10-dihydro-ergocryptine

Operating as in Example 6 and employing ethanol instead of methanol, 8,9 - didehydro-10α-ethoxy-9,10-dihydro-ergocryptine melting at 198-200° C. was obtained; $[\alpha]_D^{20} = -111°$ (c.=0.5 in chloroform).

EXAMPLE 9

1-Methyl-8,9-didehydro-10α-methoxy-9,10-dihydroergotamine

Operating as in Example 6 and starting from 1-methyl-ergotamine, 1-methyl-8,9-didehydro-10α-methoxy-9,10-dihydro-ergotamine, melting at 188-190° C. was obtained.

EXAMPLE 10

1-Methyl-8,9-didehydro-10α-methoxy-9,10-dihydroergocryptine

Operating as in Example 6, and starting from 1-methyl-ergocryptine, 1 - methyl-8,9-didehydro-10α-methoxy-9,10-dihydroergocryptine, melting at 189-191° C. was obtained.

EXAMPLE 11

8,9-Didehydro-10α-ethoxy-9,10-dihydro-ergotamine

Operating as in Example 8 and starting from ergotamine, 8,9 - didehydro - 10α - ethoxy - 9,10 - dihydro-ergotamine melting at 203-205° C. was obtained.

EXAMPLE 12

1-Methyl-8,9-didehydro-10α-ethoxy-9,10-dihydro-ergocryptine

Operating as in Example 8 and starting from 1-methyl-ergocryptine, 1-methyl-8,9-didehydro-10α-ethoxy-9,10-dihydroergocryptine melting at 163-165° C. was obtained.

What is claimed is:

1. A process for the preparation of 8,9-didehydro-10-alkoxy-ergoline compounds of the formula:

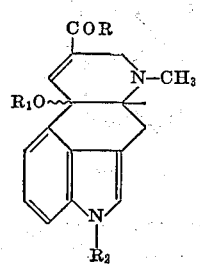

wherein R is selected from the group consisting of lower alkoxy, amino and a complex amine of the ergot series of the formula:

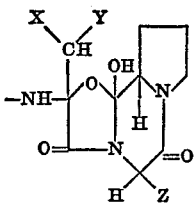

wherein X and Y are selected from the group consisting of H and CH₃ and Z is selected from the group consisting of benzyl, isopropyl and isobutyl; $R_1$ represents a linear alkyl group having from 1 to 4 carbon atoms; and $R_2$ is selected from the group consisting of hydrogen and alkyl groups having from 1 to 4 carbon atoms; which comprises the steps of reacting a compound of the formula:

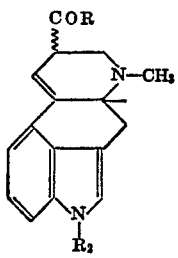

wherein R and $R_2$ have the above-mentioned meaning, with a mercuric salt, in the solution of an alcohol of the formula $R_1OH$, wherein $R_1$ has the above-mentioned meaning, at a temperature from 0 to 50° C., for a period of 2–24 hours, isolating and purifying the obtained product.

2. A compound of the formula:

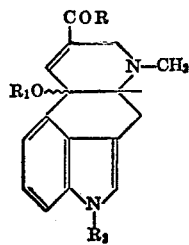

wherein R is selected from the group consisting of lower alkoxy, amino, and a complex amine of the ergot series of the formula:

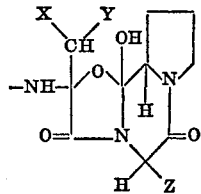

wherein X and Y are selected from the group consisting of H and CH₃ and Z is selected from the group consisting of benzyl, isopropyl and isobutyl; $R_1$ represents a linear alkyl group having from 1 to 4 carbon atoms; and $R_2$ is selected from the group consisting of hydrogen and alkyl groups having from 1 to 4 carbon atoms.

3. The compound of claim 2, which is 6-methyl-8-carbomethoxy-10α-ethoxy-8,9-didehydro-ergolene.

4. The compound of claim 2, which is 6-methyl-8-carbomethoxy-10α-ethoxy-8,9-didehydro-ergolene.

5. The compound of claim 2, which is 8,9-didehydro-10α-methoxy-9,10-dihydro-ergocryptine.

6. The compound of claim 2, which is 8,9-didehydro-10α-methoxy-9,10-dihydro-ergotamine.

7. The compound of claim 2, which is 8,9-didehydro-10α-ethoxy-9,10-dihydro-ergocryptine.

8. The compound of claim 2, which is 1-methyl-8,9-didehydro-10α-methoxy-9,10-dihydro-ergotamine.

9. The compound of claim 2, which is 1-methyl-8,9-didehydro-10α-methoxy-9,10-dihydro-ergocryptine.

10. The compound of claim 2, which is 8,9-didehydro-10α-ethoxy-9,10-dihydro-ergotamine.

11. The compound of claim 2, which is 1-methyl-8,9-didehydro-10α-ethoxy-9,10-dihydro-ergocryptine.

12. The process acording to claim 1, wherein said mercuric salt is mercuric acetate.

13. The process according to claim 1, which further comprises decomposing the excess of said mercuric salt with sodium borohydride after completion of the reaction.

References Cited

UNITED STATES PATENTS

| | | | |
|---|---|---|---|
| 3,228,943 | 1/1966 | Bernardi et al. | 260—285.5 |
| 3,585,201 | 6/1971 | Arcamons | 260—268 PE |
| 3,228,944 | 1/1966 | Bernardi | 260—285.5 |
| 3,324,133 | 6/1967 | Arcamons et al. | 260—285.5 |

OTHER REFERENCES

Schreier: Helv. Chem. Acta., vol. 41, pp. 1984–97 (1958).

Brown: Jour. Org. Chem., vol. 35, pp. 1900–4 (1970).

DONALD G. DAUS, Primary Examiner

U.S. Cl. X.R.

260—285.5, 687

PO-1050
(5/69)

UNITED STATES PATENT OFFICE
CERTIFICATE OF CORRECTION 164-14
Patent No. 3,814,765          Dated June 4, 1974

Inventor(s) Luigi Bernardi et al

It is certified that error appears in the above-identified patent and that said Letters Patent are hereby corrected as shown below:

Column 1, line 9: "54,660/70" should read -- 54,660 A/70 --.
Column 1, lines 50-51: "8 substituted-10ξ-alkoxy-ergoline" should read -- 8ξ-substituted-10ξ-alkoxy-ergoline --.

Column 3, lines 61-62: "$\lambda_{max}(CH_3HO) = 303$ nm." should read -- $\lambda_{max}(CH_3OH) = 303$ nm. --.

Column 4, line 1: "into" should read -- in --.

Column 6, line 20: "10α-ethoxy-8,9-didehydro-ergolene." should read -- 10α-methoxy-8,9-didehydro-ergolene. --.

Signed and sealed this 1st day of October 1974.

(SEAL)
Attest:

McCOY M. GIBSON JR.
Attesting Officer

C. MARSHALL DANN
Commissioner of Patents